United States Patent [19]

Siegenthaler

[11] Patent Number: 4,728,274

[45] Date of Patent: Mar. 1, 1988

[54] TIRE CURING SYSTEM

[75] Inventor: Karl J. Siegenthaler, Rome, Italy

[73] Assignee: The Firestone Tire & Rubber Company, Akron, Ohio

[21] Appl. No.: 50,661

[22] Filed: May 18, 1987

[30] Foreign Application Priority Data

May 20, 1986 [IT] Italy ................................ 67414 A/86

[51] Int. Cl.[4] ............................................. B29C 35/04
[52] U.S. Cl. ................................... 425/34 R; 425/38; 425/41; 425/44; 425/88; 425/451
[58] Field of Search ................. 198/468.8; 164/323 X; 425/17, 28 R, 34 R, 38, 40, 88, 451, 259, 348 R, 41, 44

[56] References Cited

U.S. PATENT DOCUMENTS

| 1,452,836 | 4/1923 | Hoyt ........................................ 425/38 |
| 1,465,609 | 8/1923 | Macbeth et al. ................... 425/35 R |
| 1,491,020 | 4/1924 | Abbott ............................... 425/35 R |
| 1,522,446 | 1/1925 | Haas ................................... 425/34 R |
| 1,566,251 | 12/1925 | Myers ................................. 425/34 R |
| 1,751,869 | 3/1930 | Mayne ..................................... 425/3 |
| 1,895,909 | 1/1933 | Blaker ..................................... 425/38 |
| 1,895,943 | 1/1933 | Sapp ....................................... 425/38 |
| 2,124,613 | 7/1938 | Erickson .............................. 264/334 |
| 3,477,100 | 11/1969 | Pech et al. ......................... 425/34 R |
| 3,809,739 | 5/1974 | Gelin .................................... 264/297 |
| 3,988,077 | 10/1976 | Naratov et al. ........................ 425/33 |

FOREIGN PATENT DOCUMENTS 956292 9/1982 U.S.S.R. .

*Primary Examiner*—Willard E. Hoag
*Attorney, Agent, or Firm*—Ernst H. Ruf

[57] ABSTRACT

A tire curing apparatus in which a number of mobile curing units, each designed to house a respective green tire, are selectively and independently fed along a loop circuit having at least two parallel branches, the ends of which branches are connected to a common section extending through a station for loading and unloading tires on and off respective curing units; each curing unit incorporating a mold for a respective green tire, a closed pneumatic circuit designed to receive, at the loading/unloading station, a given supply of curing medium under pressure, a fan device for force circulating the curing medium supply inside the pneumatic circuit, and individual elements for heating both the mold and the curing medium supply.

11 Claims, 3 Drawing Figures

TIRE CURING SYSTEM

TECHNICAL FIELD

The present invention relates to a tire curing system.

BACKGROUND OF THE ART

Such systems are known to generally present one or two molds, each comprising top and bottom mold halves defining an annular chamber for a green tire. The top mold half is usually connected to a moving crosspiece on the press, whereas the bottom mold half is mounted on the bed of the press and supports a deformable inner tube or curing bladder designed to occupy the said annular chamber when inflated with a heat-exchanging curing medium or media. The said curing media, usually consisting of relatively hot steam, is supplied under pressure by a external feeder, which provides for heating the curing media, possibly after producing and filtering it, and circulating it under pressure inside the mold for the length of time required for curing.

A major drawback of known systems of the aforementioned type is that they involve relatively high manufacturing cost and provide for relatively low output. Such systems in fact require a relatively high-cost press for every one or two molds, which press remains engaged throughout the entire curing operation.

Furthermore, the slightest change in design entails relatively prolonged downtime for machining, during which time the press remains idle. Also, if the heat-exchanging curing media employed consists, as it does in all known present cases, of relatively hot steam, systems of the aforementioned type must therefore include an extremely high-cost accessory system for water purification and steam production.

For partially overcoming these drawbacks, systems have been devised comprising a number of molds mounted in a fixed manner on an indexing fixture which, turning about a fixed vertical axis, feeds the molds, one by one, through a loading station where each mold is opened, loaded and closed by a fastening device on the mold itself. Each mold is then turned on the indexing fixture and supplied, as long as required for curing, with steam under pressure fed from a centralized feeding device connected to all the molds on the indexing fixture.

Though systems of the aforementioned type involve no presses and provide for using a large number of molds at the same time, they are nevertheless extremely expensive in that they also require a separate system for filtering, producing, heating and supplying steam, as well as a number of sliding joints for connecting each moving mold to the said system. Furthermore, the said indexing fixture, to which the bottom half of each mold is necessarily integrally connected, imposes the same supply route and the same curing time for each mold, with no possibility of selective curing.

Finally, in this case also, the slightest change in design entails relatively prolonged downtime during which the system remains idle.

DISCLOSURE OF THE INVENTION

It is an object of the present invention to provide a curing system involving none of the aforementioned drawbacks, and which provides for a high degree of production flexibility.

In particular, it is an object of the present invention to provide a system which may be operated selectively for enabling either sequence curing of tires of different design, or curing of a given design and switching to another with substantially no downtime involved for machining.

According to the present invention, there is provided a tire curing system, characterized by the fact that it comprises a number of mobile curing units, each designed to house a respective green tire; loading means and unloading means for respectively loading said tires on and unloading said tires off respective ones of said curing units, a loop path for the said units; guide means for said mobile curing units, said guide means defining a path extending between said loading means and said unloading means, means for selectively feeding the said units along the said path; and individual coupling means provided on each said curing unit for releasably and independenty coupling the same to said guide means; each of said curing units incorporated a mold for a respective green tire, a closed circuit designed to receive, at the said loading means, a given supply of curing media under pressure, means for force circulating the said curing media supply inside the said closed circuit, and individual elements for heating both the said mold and the said curing media supply.

The invention will now be described by way of example with reference to the attached drawings.

BEST MODE FOR CARRYING OUT THE INVENTION

Figure 1:
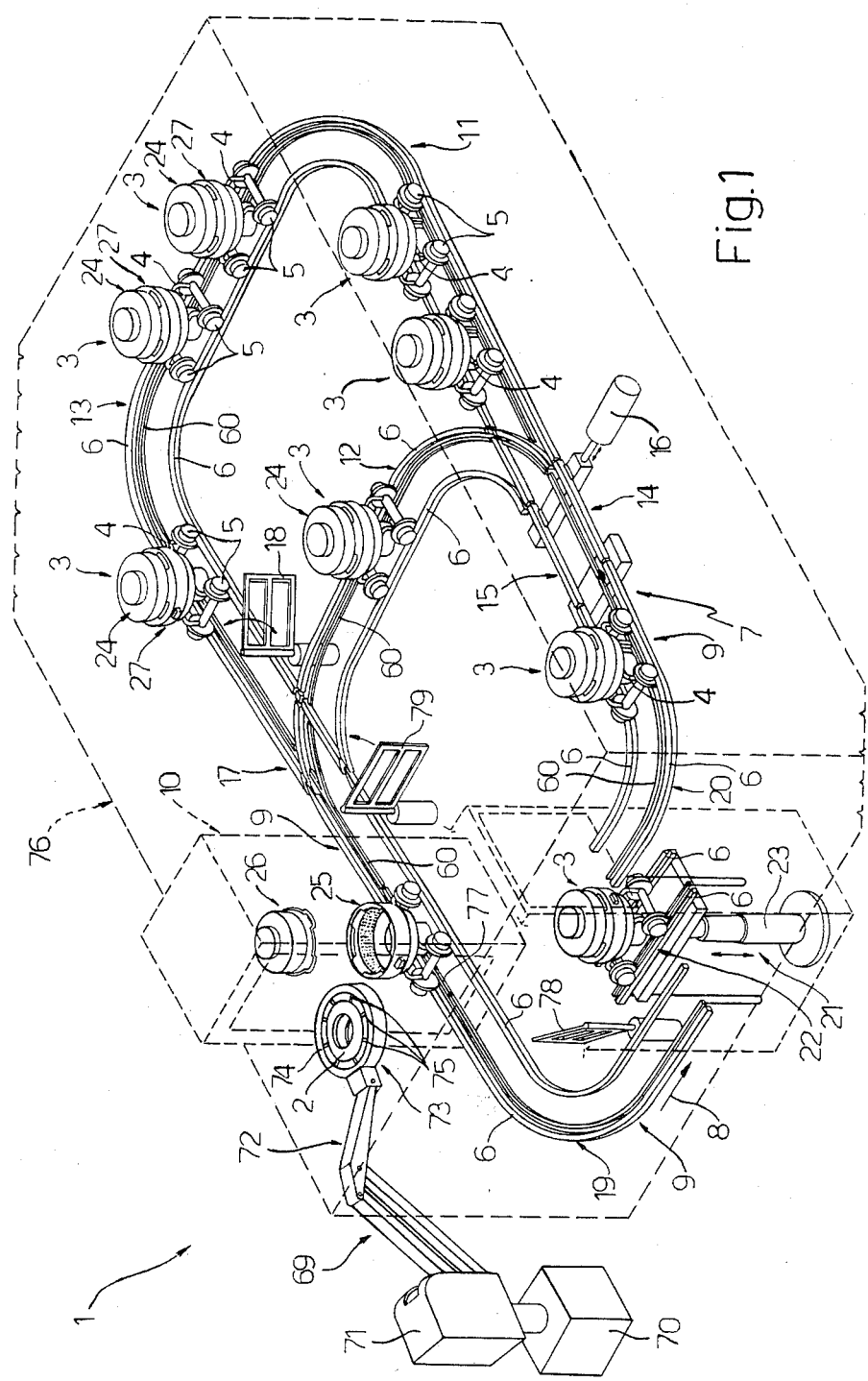
FIG. 1 is a schematic perspective view of a tire curing system in accordance with the present invention.

Numeral 1 in FIG. 1 indicates a system for curing tires 2, said system comprising a number of mobile curing units 3, each designed to receive a respective tire 2.

For a detailed description of curing unit 3, reference should be made to co-pending U.S. application Ser. No. 07/050,660, filed concurrently herewith by the Assignee of the present invention and which is incorporated herein by reference in the interest of full disclosure.

Each unit 3 is mounted in a fixed manner on a respective carriage 4 mounted on rollers 5 enabling carriage 4 to travel along two tubular rails 6 defining a loop path or circuit 7 along which mobile units 3 are fed in the direction indicated by arrow 8.

Circuit 7 comprises a first portion 9, extending through a station 10 for loading and unloading tires 2 on and off respective units 3, and a second portion 11 comprising two branches 12 and 13 arranged in parallel. The upstream end of each branch 12 and 13, in the travelling direction of units 3, is selectively connectable to a downstream end of circuit portion 9 by means of a switch device 14 comprising a rail section 15 designed to move between two different operating positions by virtue of actuator 16. The downstream ends of branches 12 and 13 are connected to the upstream end of portion 9 by means of a three-way intersection 17 controlled by a locking device 18 designed to move selectively between two operating positions, for selectively closing the outlet of either of branches 12 and 13.

As shown in FIG. 1, both branches 12 and 13 slope downwardly, and portion 9 of circuit 7 is divided into two downward-sloping sections 19 and 20. In more detail, from intersection 17, section 19 extends downwards through station 10, and presents a downstream end lower than the upstream end of section 20 to which it is connected by a lift 21 supporting a rail section 22 and designed to move vertically between two different operating positions, by virtue of actuator 23.

Figure 3:
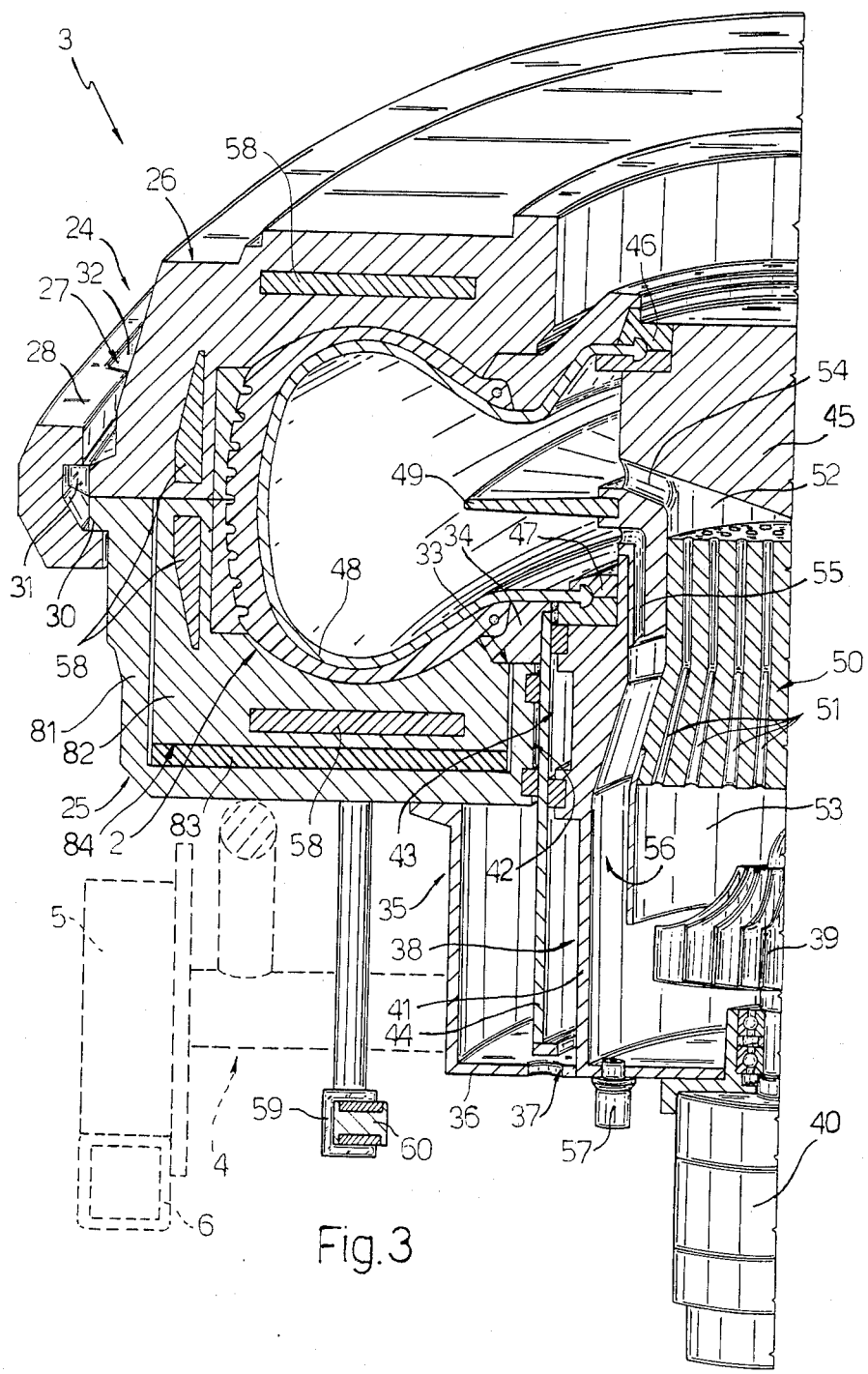
FIG. 3 is an axial half section of a curing unit used in the curing system shown in FIG. 1.

As shown in FIG. 3, each mobile curing unit 3 comprises a mold 24 consisting of a bottom mold half 25 and a top mold half 26, both annular and interconnected by a bayonet joint 27 in the form of an outer ring 28 surrounding mold 24.

Ring 28 includes an outer extension 29 (FIG. 2) which may be acted on for turning ring 28 about mold 24 and between a locking position, wherein ring 28 locks together, in contacting manner, an outer annular flange 30 on mold half 25 and a number of wedge-shaped teeth 31 extending radially outwardly of mold half 26, and an opening position, wherein ring 28 presents slots 32 facing teeth 31, thus enabling axial detachment of mold half 26 from mold half 25.

For ensuring efficient sealing at all times during curing, between mold halves 25 and 26, bottom mold half 25 is formed in two annular pieces 81 and 82, the first consisting of a cup-shaped outer casing and being provided with annular flange 30, and the second consisting of a torus constituting the the bottom mold half proper. Torus 82 is mounted inside casing 81 so as to slide towards mold half 26 under the thrust of a flexible compensating member 83 housed inside a variable-volume annular chamber 84 defined between the lower surface of torus 82 and the upper surface of the end wall of casing 81.

In the example shown, flexible member 83 consists of a layer of flexible material which may obviously be replaced, in variations not shown, for example, by set springs or gas under pressure.

On its inner edge, mold half 25 presents a top annular groove 33 defining a supporting seat for annular body 34.

To the bottom surface of mold half 25 is connected the top flanged end of a bell 35 coaxial with mold 24. An end wall 36 on bell 35 presents a number of through holes 37 and supports a bottom portion of a substantially cylindrical casing 38.

Casing 38 houses, at the bottom, a fan 39 having a drive motor 40, and comprises a substantially cylindrical side wall 41 a top portion of which engages, in radially slack manner, a center hole 42 on mold half 25, in such a manner as to define an annular sliding slit 43 for a cylindrical tubular piston 44 the outside diameter of which is smaller than the inside diameter of tire 2. At the bottom, piston 44 faces holes 37 and is connected, at the top, to annular body 34, which acts as a stop for arresting the downward axial slide of piston 44 and, at the same time, as an extracting element for extracting tire 2 from mold half 25.

Side wall 41 is closed at the top by a cap 45 which is fitted over hole 42. The top portion of cap 45 and the top portion of wall 41 are fitted respectively with a top annular fastening element 46 and a bottom annular fastening element 47 for respectively fastening the top and bottom edges of an annular inner tube or curing bladder 48 made of elastomer, having a substantially C-shaped radial half section and designed to expand inside tire 2.

Annular fastening elements 46 and 47 present respective outside diameters smaller than the inside diameter of tubular piston 44, and are separated by a flat annular lip 49 made of elastomer, the inner edge of which is secured to the outer peripheral surface of cap 45.

Casing 38 is fitted inside with a heating element 50 having a number of through axial channels 51 and dividing the space inside casing 38 into a top chamber 52 and a bottom chamber 53. Chambers 52 and 53 communicate with the space inside inner tube 48 via respective rows of holes 54 and 55 formed respectively through the top of wall 41 above lip 49 and through wall 41 below lip 49.

Chamber 53 and housing fan 39 define, together with channels 51, chamber 52, the space inside inner tube 48, and holes 54 and 55, a closed pneumatic circuit 56 for circulating a given supply of heat-exchanging curing media, preferably nitrogen gas, injected externally, at loading station 10, through a supply/exhaust valve 57 mounted on the bottom wall portion of casing 38.

Molds halves 25 and 26 are fitted with electrical heating resistors 58 connected, together with heating element 50 and motor 40, to an external electrical power source (not shown) by means of a connector 59 located outside mold 24 and connected, in sliding manner, to a power supply and control data transmission rail 60 extending along rail 6.

Figure 2:
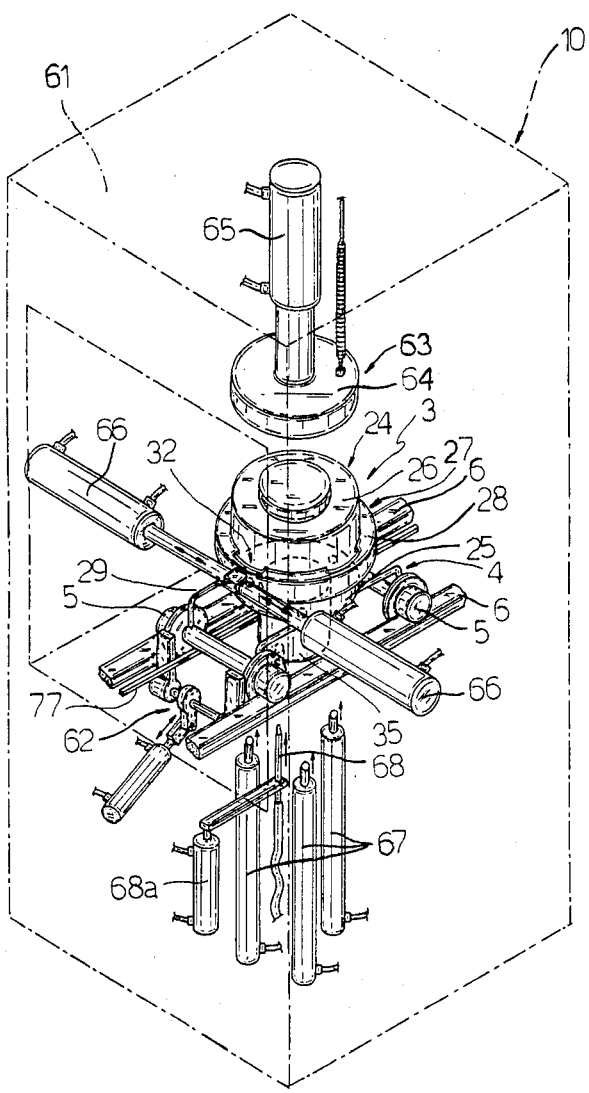
FIG. 2 is a schematic perspective view of a loading station in FIG. 1.

As shown in FIG. 2, station 10 comprises a portal or superstructure 61 through which run rails 6 and which is fitted with a locking device 62 for arresting each carriage 4 in a given loading/unloading position underneath portal 61.

With a carriage 4 in the said loading/unloading position, its respective curing unit 3 is positioned with its top mold half 26 directly beneath a lifting device 63 comprising a magnetic head 64 and an actuating device 65 supported on the upper crosspiece of portal 61 and designed to move head 64 from a lowered position, contacting top mold half 26, connected to bottom mold half 25, into a raised position.

With a carriage 4 in the said loading/unloading position, respective curing unit 3 moves into position with extension 29, of its outer ring 28 engaging a pair of horizontal actuators 66 which may be operated for turning outer ring 28 on mold 24 between two operating positions for respectively opening and closing bayonet joint 27. Also, each of holes 37 on bell 35 is located over a respective actuator or vertical hydraulic cylinder 67 mounted in a fixed manner underneath portal 61 and designed to move piston 44 between a normal lowered position and a raised extraction and loading position. Finally, valve 57 is located over an ejector 68 on a pneumatic loading circuit, which ejector is located beneath portal 61 and designed to move, by virtue of actuator 68a, between a lowered idle position and a raised position. In the latter position, ejector 68 engages valve 57 in such a manner as to open it, exhaust the said curing media inside unit 3 and subsequently inject a new supply of curing media.

As shown in FIG. 1, loading station 10 also includes a loading robot 69, which is located adjacent to portal 61 and includes a supporting body 70, a platform 71 mounted on supporting body 70 and turning in relation to the same about a vertical axis, and an articulated arm 72 mounted on platform 71 for moving, in relation to the same and in a substantially vertical plane, a known type of ring fastening device 73 comprising an outer ring 74 having a number of inner radial pistons 75 designed to engage the tread surface of a tire 2.

Finally, system 1 as described also includes a thermally insulated outer case 76 for retaining the heat given off by units 3 during curing.

System 1 may be operated in two ways, depending on whether it is supplied with one or two types of tires.

The one-type-tire operating mode will now be described starting from the time when unit 3, having completed its curing cycle, arrives in station 10 and is locked, by locking device 62, beneath portal 61.

With unit 3 in the loading/unloading position beneath portal 61, its respective connector 59 engages a section 77 of rail 60, said section 77 enabling only the transmission of control signals, and no supply of electrical power to unit 3.

Ejector 68 is raised for releasing the pressurized curing media charge inside unit 3, after which, horizontal actuators 66 are activated so as to turn ring 28 and open bayonet joint 27, and lifting device 63 is moved down so as to engage magnetic head 64 with top mold half 26. Mold 24 is then opened, by lifting up magnetic head 64 and top mold half 26. At the same time, actuators 67 are operated for pushing up piston 44 which performs a dual function by first deforming inner tube 48 into a "tulip" shape and extracting it from cured tire 2, and then lifting tire 2 out and over bottom mold half 25 into ring 74 on fastening device 73 already positioned between raised top mold half 26 and bottom mold half 25. Subsequent to the operation of pistons 75, cured tire 2 is gripped by fastening device 73 and carried, by the operation of robot 69, over to an unloading table (not shown).

Robot 69 then grasps a green tire 2 off a supply conveyor (not shown) and after conveying same, releases it onto open bottom mold half 25, specifically on annular body 34 on piston 44 held up by actuators 67. Actuators 67 are then lowered for lowering piston 44, which performs a dual function by first reinserting annular body 34 inside respective groove 33 and placing green tire 2 onto bottom mold half 25, as well as releasing inner tube 48 which is thereafter supplied by ejector 68 with a relatively low-pressure "shaping charge" for inflating inner tube 48 and inserting it inside green tire 2.

At this point in time, top mold half 26 is lowered onto bottom mold half 25 and released by magnetic head 64, with actuators 66 being operated for closing bayonet joint 27. The rest of the curing media charge is injected by ejector 68, and unit 3, now fully released, is allowed to run down, by force of gravity, along section 19 of portion 9 of circuit 7, by releasing device 62.

Downward travel of unit 3 along section 19 causes respective connector 59 to hook up automatically to the conducting portion of rail 60, and also activates resistors 58, heating element 50 and fan 39 for commencing the curing process.

Rails 6, extending along circuit section 19, are usually occupied by further units 3 resting against one another and against a lock gate 78 at the entry to lift 21 designed to transfer units 3 one at a time from section 19 to section 20, at a rate depending on the required curing time.

Travelling by force of gravity along section 20, unit 3 comes to circuit portion 11 and runs onto whichever one of branches 12 and 13 is held open by switch device 14.

After travelling along branch 12 or 13, unit 3 proceeds by force of gravity through intersection 17, along an initial portion of circuit section 19, and stops against a lock gate 79 which opens to let one unit 3 at a time into station 10 where it is stopped against lock device 62.

The time taken for any unit 3 to travel the whole circuit 7 is regulated mainly by lift 21, in such a manner as to exactly equal the time required for curing its tire 2.

Consequently, upon arrival of a unit 3 in station 10, its respective tire 2 may be unloaded so as to enable that unit 3 to commence a new cycle.

As shown in FIG. 1, a few units 3 are kept idle by locking device 18 on whichever of branches 12 and 13 is not being employed at the time. During normal operation of system 1, such units may be set up for receiving tires of different design from tires 2 being processed at the time on system 1, thus enabling production change by simply operating locking device 18 and switch device 14.

Similarly, by operating locking device 18 and switch device 14, station 10 may be supplied with a succession of units 3 for tires 2 of different designs, thus operating system 1 in the aforementioned second operating mode.

As further branches may be added on parallel with branches 12 and 13, system 1 may obviously be operated for curing tires of a given number of different designs, either simultaneously or successively.

The advantages of system 1 as compared with known curing systems will be clear from the foregoing description. In particular, it provides for a high degree of versatility, while at the same time eliminating downtime for production changes, by virtue of the design of units 3, each of which is fully independent of both other units 3 as well as station 10, and may be handled in any manner along circuit 7.

A further advantage of system 1, and one not to be underestimated, is that the heat given off by curing units 3 is retained by outer casing 76 and partly absorbed by stand-by units 3 which, when operated, are thus preheated and require relatively little energy for attaining the required curing temperature.

From the forgoing description and the operational discussion, when read in light of the several drawings, it is believed that those familiar with the art will readily recognize and appreciate the novel concept and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes or the like without departing from the sirit and scope of the invention with the latter being determined solely by reference to the claims appended hereto.

What is claimed is:

1. A tire curing apparatus comprising a number of mobile curing units, each designed to receive a respective green tire; loading means and unloading means for respectively loading said tires on and unloading said tires off respective ones of said curing units, inclined guide means defining a loop path for said mobile units; said path extending between said loading means and said unloading means; means for feeding the said units along the said path; and individual coupling means provided on each said curing unit for releasably and independently coupling the same to said guide means; each of said curing units incorporating a mold for a respective green tire, a closed circuit means designed to receive, at the said loading means, a given supply of curing medium under pressure, means for circulating the said curing medium supply inside the said closed circuit means, and individual heating elements for both the said mold and the said curing medium supply.

2. An apparatus as claimed in claim 1, wherein said feeding means being selective to feed each said curing unit along said path independently of the other said curing units.

3. An apparatus as claimed in claim 1, wherein said path includes, between said loading and unloading means, at least two branches arranged in parallel; switching means being provided for selectively excluding one of said two branches.

4. An apparatus as claimed in claim 1, 2 or 3, wherein said feeding means are includes gate means; said path including lift means arranged between a lower point and an upper point of said path; and said lift means being operable for selectively displacing each said curing unit from said lower point to said upper point.

5. An apparatus as claimed in claim 1, 2 or 3 further including an outer thermally insulated housing; said loading means, said unloading means, said guide means and said curing units being housed within said housing.

6. A tire curing apparatus comprising a number of mobile curing units, each designed to receive a respective green tire, means for loading and unloading the said tires on and off respective ones of said mobile curing units cooperating with an inclined loop track for the said units, said track including at least two branches arranged in parallel, means for selectively feeding the said units along the said track and switching means for selectively excluding one of the said two branches; each of said curing units incorporating a mold for a respective green tire, a closed pneumatic circuit means designed to receive at the said loading and unloading means, a given supply of curing medium under pressure, a fan device for force circulating the said curing medium supply inside the said closed pneumatic circuit means, and individual elements for heating both the said mold and the said curing medium supply.

7. An apparatus as claimed in claim 6, wherein a carriage is provided to support a respective one of said curing units, said track being defined by rails, and each said carriage being mounted for movement along said rails.

8. An apparatus as claimed in claim 7, wherein said means for selectively feeding said curing units along said track include gate means.

9. An apparatus as claimed in claim 6, wherein said track further comprises a track portion extending adjacent said loading and unloading means and is divided into two parts; an end of one of said parts facing a start of the other part and being arranged at a lower level than said start; and lift means for said curing units being arranged between said end and said start to selectively transfer said curing units from one of said parts to the other.

10. An apparatus as claimed in claim 6, 7, 8 or 9, wherein each said curing unit comprises an upper mold half, a lower mold half, and releasable locking means for connection of said mold halves together; said loading and unloading means comprising first actuator means for operating said locking means, second actuator means for engaging one of said mold halves and moving same axially relative to the other half, third actuator means for both locating said tire in, and for ejecting same from, one of said mold halves, and means for providing said given supply of curing medium.

11. An apparatus as claimed in claim 6, wherein a thermally insulated housing is provided for said loop track and said loading and unloading means.

* * * * *

UNITED STATES PATENT AND TRADEMARK OFFICE
CERTIFICATE OF CORRECTION

PATENT NO. : 4,728,274
DATED : March 1, 1988
INVENTOR(S) : Karl J. Siegenthaler

It is certified that error appears in the above-identified patent and that said Letters Patent are hereby corrected as shown below:

Column 6, line 51, "sirit" should be "spirit"

Signed and Sealed this

Thirtieth Day of August, 1988

Attest:

DONALD J. QUIGG

*Attesting Officer*    *Commissioner of Patents and Trademarks*